(12) United States Patent
Chiu et al.

(10) Patent No.: US 8,270,089 B2
(45) Date of Patent: Sep. 18, 2012

(54) THERMOPLASTIC POLYURETHANE LENSES WITH A SPECIFIED WEIGHT PERCENTAGE OF URETHANE REPEATING UNITS

(75) Inventors: Hao-Wen Chiu, Palm Harbor, FL (US); Roger A. Mayr, Seminole, FL (US); Leanirith Yean, Longjumeau (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 183 days.

(21) Appl. No.: 11/732,945

(22) Filed: Apr. 5, 2007

(65) Prior Publication Data

US 2008/0246187 A1    Oct. 9, 2008

(51) Int. Cl.
G02B 3/00 (2006.01)
B29D 11/00 (2006.01)
C08G 18/00 (2006.01)

(52) U.S. Cl. .......... 359/652; 359/651; 351/41; 351/110; 351/166; 264/1.7; 264/1.32; 264/2.7; 264/1.31; 528/59; 528/76; 528/85; 528/80; 528/502 C

(58) Field of Classification Search .............. 528/44, 528/65, 502 C, 59, 76, 80, 85; 525/458; 351/41, 110, 166, 159; 264/1.32, 2.2, 1.7, 264/2.7, 1.31
See application file for complete search history.

(56) References Cited

U.S. PATENT DOCUMENTS

| 4,822,827 | A | | 4/1989 | Bonk et al. | |
|---|---|---|---|---|---|
| 5,319,039 | A | * | 6/1994 | Moses et al. | 525/424 |
| 5,531,940 | A | * | 7/1996 | Gupta et al. | 264/1.7 |
| 5,679,756 | A | * | 10/1997 | Zhu et al. | 528/65 |
| 6,043,313 | A | * | 3/2000 | Brink et al. | 524/589 |
| 6,319,433 | B1 | * | 11/2001 | Kohan | 264/1.32 |
| 7,014,315 | B2 | * | 3/2006 | Iori et al. | 351/159 |
| 7,135,545 | B2 | | 11/2006 | Yang et al. | |
| 2004/0125335 | A1 | * | 7/2004 | Vu | 351/159 |
| 2004/0180211 | A1 | * | 9/2004 | Moravec et al. | 428/422.8 |
| 2005/0245720 | A1 | * | 11/2005 | Yang et al. | 528/86 |
| 2006/0202369 | A1 | * | 9/2006 | Foreman et al. | 264/1.32 |
| 2010/0124649 | A1 | * | 5/2010 | Rukavina et al. | 428/292.1 |

FOREIGN PATENT DOCUMENTS

WO    WO2006/015325    *    2/2006

OTHER PUBLICATIONS

Texin DP7-3007 Datasheet. Bayer International. p. 1-6.*
Texin DP7-3007 MSDS. Bayer International. p. 1-4.*
http://www.calce.umd.edu/general/Facilities/Hardness_ad_.htm, 2001, Material Hardness.*
The Dow Chemical Company, ISOPLAST* 301—Engineering Thermoplastic Polyurethane Resin., 2 pgs., Apr. 2006.

(Continued)

*Primary Examiner* — Ling Choi
*Assistant Examiner* — Michael L Leonard
(74) *Attorney, Agent, or Firm* — Keusey & Associates, P.C.

(57) ABSTRACT

A method of forming thermoplastic polyurethane (TPU) into an optical lens. Suitable TPUs contain urethane (—NH-COO—) repeating units that are present in at least 23% by weight. This range of urethane weights is an indicator of a flexural modulus above 1,400 MPa. The TPUs have refractive indices above 1.54 and Abbe numbers above 27. They have glass transition temperatures above about 100 degrees C. The selected TPU can be injection molded to form ophthalmic lenses, that are well suited for use in rimless spectacles. The lenses are highly solvent resistant, while at the same time being readily tintable. The lenses made according the invention meet FDA 21 CFR 801.41 Impact Requirement, and ANSI Z87.1 high velocity impact (HVI) standard.

7 Claims, 3 Drawing Sheets

OTHER PUBLICATIONS

The Dow Chemical Company, ISOPLAST* 2530—Engineering Thermoplastic Polyurethane Resin for Medical Applications., 2 pgs., Apr. 2006.

The Dow Chemical Company, ISOPLAST* 2531—Engineering Thermoplastic Polyurethane Resin for Medical Applications., 2 pgs., Apr. 2006.

* cited by examiner

PC Nasal

TPU Nasal

THERMOPLASTIC POLYURETHANE LENSES WITH A SPECIFIED WEIGHT PERCENTAGE OF URETHANE REPEATING UNITS

BACKGROUND OF THE INVENTION

1. Field of the Invention

The present invention relates to a method for forming a lens from a thermoplastic polyurethane with a specified weight percentage of urethane repeating units (—NHCOO—) having an excellent balance of optical and mechanical properties.

2. Description of the Related Art

Materials used in optical lenses must have several optical properties such as suitable refractive indexes, suitable Abbe numbers, sufficient hardness and a low yellowness index. The following survey provides the current state of the art with regard to mechanical and optical properties of some urethane polymers.

U.S. Pat. No. 5,679,756 describes the process of producing thermoplastic thiourethane-urethane copolymers (TTUC). The patent discloses that TTUC may be used as a material of optical products and may be formed by employing injection molding or compression molding techniques. The patent describes desirable material properties as a refractive index between about 1.58 and approaching 1.60 and an Abbe number above about 32. The patent also states that ophthalmic lens materials should have a shore D hardness greater than 85 and implies that a material with an Abbe number below 30 is unsuitable for use as ophthalmic lenses. Various forms of TTUC were shown in the patent to have refractive indexes between 1.579 and 1.594, Abbe numbers between 34 and 38, and Shore D Hardness numbers of 86 or 87. TTUC was compared with Dow Chemical commercial thermoplastic polyurethanes (TPUs) such as Isoplast 301 and various Pellethanes. Additionally, the patent states that although Isoplast 301 has a refractive index of 1.5952 and a shore hardness of 88, its Abbe number, 28, would make it an exceptionally poor choice for use in ophthalmic lenses. The patent also generally describes commercially available TPUs in 1995 as being unsuitable materials for ophthalmic lenses because they have low glass transition temperatures, low hardness, high yellowness, and poor refractive index and Abbe number combinations. The patent additionally discusses tinting and making the lenses of its invention photochromic.

U.S. Pat. No. 4,822,827 describes the process of producing various TPUs with high glass transition temperatures. The patent characterizes these materials as having high flexural moduli, excellent optical clarity due to their excellent light transmission extending into the UV region, and virtually no yellow coloration. The patent discloses that the optical qualities are particularly useful in medical devices, including surgical instrument trays for steam sterilization and similar devices. The patent states that the TPUs described may also be molded using injection molding and compression molding techniques among others. The patent also discloses TPUs with flexural moduli above about 1030 MPa, and specifically describes TPUs with Flexural Moduli ranging from 1741 MPa to 3478 MPa. It mentions TPUs with light transmittance between 87.17% and 90.50% and a yellow index between 1.50 and 4.13.

The prior art is directed to synthesizing various thiourethane and urethane copolymers and does not particularly address techniques for thermoforming ophthalmic lenses. Accordingly, the prior art fails to identify the correlation of NHCOO presence to acceptable mechanical properties along with lower glass transition temperatures for improved processing and cosmetics.

SUMMARY OF THE INVENTION

It is an object of the present invention to provide thermoplastic polyurethanes having specified molecular structures for forming optical lenses.

It is a further object of the invention to provide TPUs that have a good balance of mechanical and optical properties.

It is yet another object to provide TPU's with increased hydrogen bonding for greater stress resistance in rimless spectacles.

It is a further object to enhance the optical properties by providing additives to control yellowness.

These and other related objects are achieved according to the invention by a method of forming thermoplastic polyurethanes (TPU) into a highly transmissive optical lens wherein the resulting lens exhibits a reduction in the initiation and propagation of flaws by forming an optical lens by lens shaping from a TPU having a percentage by weight of urethane repeating units (—NHCOO—) above 23%, where the optical lens has a greater resistance to stress induced cracking and crazing.

The TPU has a flexural modulus above about 1,400 MPa and a glass transition temperature ($T_g$) of between about 100° C. and about 140° C. The TPU has a refractive index, $n_d$, above 1.54 and an Abbe number above 27. Prior to forming the lens, one or more additives, for example, an antioxidant, an ultra-violet light absorber (UVA), or a hindered amine light stabilizer (HALS) may be added to the TPU. The TPUs have an Abbe number between about 27 and about 45 and a refractive index, $n_d$, between about 1.54 and about 1.60.

The TPU is solvent resistant and the optical lens is tintable. The lens shaping operation may be injection molding or compression molding. In one embodiment, an optical color stabilizer is blended with the TPU and injection molded into an ophthalmic lens. Further steps may include coating the lens with at least one protective layer and drilling through the coating and the optical lens to form a bore bordered by a side wall. A rimless spectacle is formed by attaching brackets to the lens via the bore. The stated weight percentage of urethane repeating units (—NHCOO—) renders an optical surface formed from a final lens shaping operation having greater resistance to stress induced cracking and crazing. The side wall has a greater resistance to stress induced cracking and crazing. Prior to coating a tint may be applied to the TPU lens.

The invention also covers an ophthalmic lens for a rimless spectacle produced by the disclosed methods. The lens may include an additive selected from the group consisting of an antioxidant, an ultra-violet light absorber (UVA), a hindered amine light stabilizer (HALS) and combinations thereof. The stated weight percentage of urethane repeating units (—NHCOO—) in the lens renders a side wall with improved containment of flaws created in the TPU during drilling so that the flaws are less likely to grow and propagate to cause cracking and crazing in the lens substrate and the protective coating layer.

BRIEF DESCRIPTION OF THE DRAWINGS

The advantages, nature, and various additional features of the invention will appear more fully upon consideration of the illustrative embodiments now to be described in detail in connection with accompanying drawings. In the drawings.

DETAILED DESCRIPTION OF PREFERRED EMBODIMENTS

Figure 1:
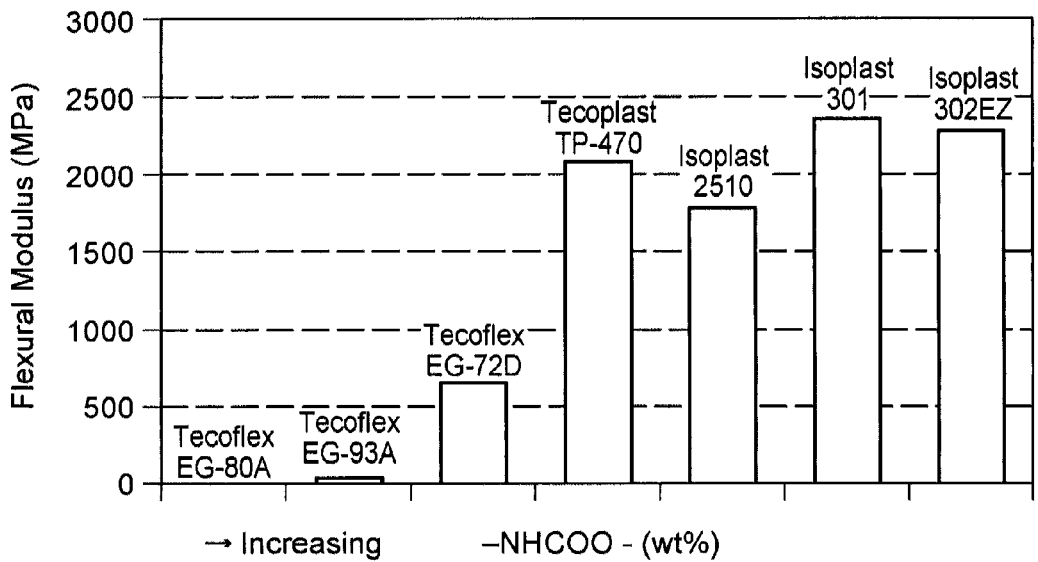
FIG. 1 is a bar graph of the flexural moduli of various TPU materials compared to their corresponding weight percentage of urethane repeating units.

The present invention provides methods for forming TPUs with a high resistance to stress induced cracking and crazing into optical lenses, which are especially suitable for rimless eyewear. The thermoplastic polyurethanes (TPU) have a specified weight percentage of urethane repeating units (—NHCOO—). Applicant's recognized that an increasing presence of urethane repeating units was positively correlated to increasing flexural modulus, which leads to good dimensional stability in lenses. It was further recognized that increasing urethane was positively correlated to increased hydrogen bonding, which provides good stress cracking resistance that is particularly suited for rimless spectacles. The hydrogen bonding correlation was surprising because overall hydrogen content decreases with increasing urethane presence.

Certain of the above mentioned TPUs possessed borderline yellowness indices. Prevailing thought within the industry was that such materials could not be used for lenses. However, Applicant's recognized that certain TPU's had a relatively low glass transition temperature which could be exploited to reduce thermo-oxidative degradation during thermoforming operations. In addition, the selected TPU's have good solvent resistance in combination with excellent tintability, that overall provides acceptable color and other optical properties.

As discussed in the Zhu patent, many commercially available TPUs tend to have less desirable optical properties characterized by a low Abbe number and a high yellowness. The Abbe number is a measure of dispersion of light waves in the visible region. The lower the Abbe number is, the less desirable it is to use it as a material for optical lenses. Zhu specifies an Abbe number above about 32 for use in ophthalmic lenses. In addition, Zhu describes TPUs as being problematic for use as optical lenses, due to their tendency to progressively yellow as a result of thermo-oxidative degradation and photo degradation.

The main difference between the thiourethane of Zhu and a urethane is that thiourethanes are made of isocyanates and thiols (R—SH) while urethanes are made from isocyanates and alcohols (R—OH). In the case of thermoplastic thiourethane-urethane copolymers, diisocyanates such as MDI (4,4'-methylene bis(phenyl isocyanate)) and HMDI (4,4'-methylene bis(cyclohexyl isocyanate)) are reacting with both dithiols, e.g. 2,2'-thiodiethanethiol or bis(2-mercaptoethyl) sulfide, and diols, e.g. cyclohexane dimethanol to form the copolymers. In the process according to the invention, we use thermoplastic polyurethanes, having as the main reactants diisocyanates and diols (and optionally small amounts of polyols). There are no thiols of any form in the TPUs. One type of polyurethane that can be used in the invention is synthesized from MDI, 1,6-hexanediol, cyclohexanedimethanol, and polytetramethylene glycol.

Another aspect of the present invention includes forming materials with high resistance to stress induced cracking and crazing into optical lenses. It was found that TPUs with a high weight percentage of urethane repeating units (—NH-COO—) tend to have high flexural moduli due to their capability of the urethane repeating units to form hydrogen bonds. Several commercially available TPU resins produced by the Dow Chemical Company and Noveon were analyzed to determine the relationship between the weight percentage of urethane repeating units and the flexural modulus of the materials. Table 1 shows the results of elemental analysis conducted on the TPU materials as well as their corresponding weight percentages of urethane repeating units and flexural moduli.

TABLE 1

|  | % C | % H | % O | % N | —NHCOO— (wt %) | Flexural Modulus (MPa) |
|---|---|---|---|---|---|---|
| Tecoflex EG-80A | 65.8 | 10.8 | 21.0 | 2.3 | 9.8 | 7 |
| Tecoflex EG-93A | 65.5 | 10.2 | 19.9 | 4.2 | 17.6 | 22 |
| Tecoflex EG-72D | 65.0 | 9.9 | 19.2 | 5.5 | 23.3 | 634 |
| Tecoplast TP-470 | 69.1 | 7.4 | 17.6 | 6.0 | 25.3 | 2068 |
| Isoplast 2510 | 67.8 | 7.2 | 18.6 | 6.5 | 27.3 | 1793 |
| Isoplast 301 | 69.0 | 6.8 | 17.0 | 6.9 | 29.0 | 2344 |
| Isoplast 302EZ | 70.0 | 6.7 | 16.3 | 7.1 | 29.8 | 2275 |

Figure 2:
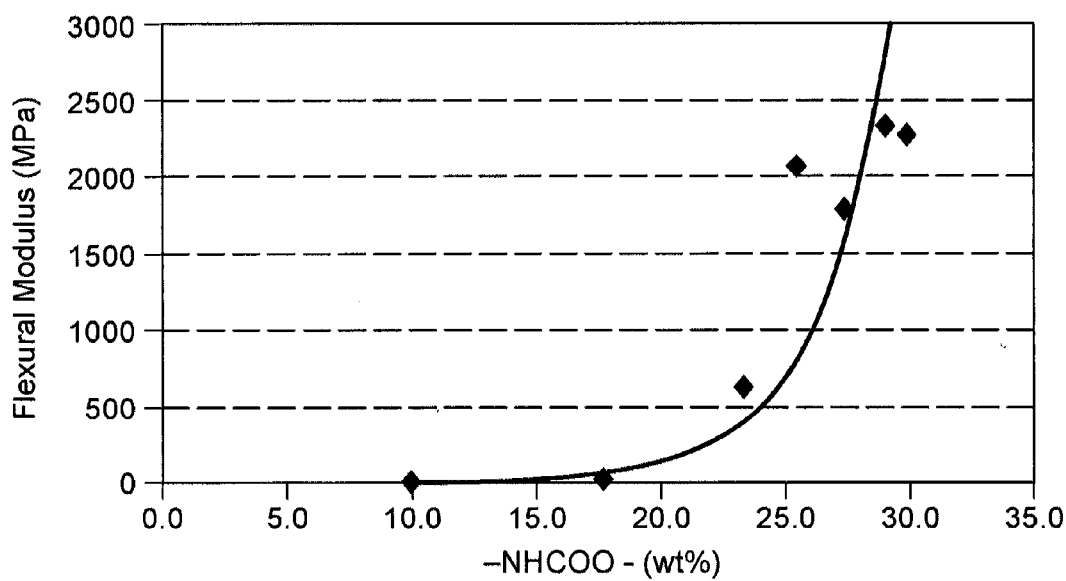
FIG. 2 is a graph plotting the data from FIG. 1 to illustrate the relationship between variables.

The flexural modulus of materials suitable for eyewear application is above about 1400 MPa. FIG. 1 is a bar graph of the urethane weight percentage of column 6 versus the flexural modulus of column 7. FIG. 2 is a plot of the flexural moduli according to ASTM D 790 versus the weight percentage of urethane repeating units of the TPU materials listed in Table 1. Each bar from FIG. 1 is plotted as a point on FIG. 2. The bars from left-to-right correspond to the points from left-to-right, that is by increasing urethane weight.

The materials and points represent samples of one group of TPUs. The line of FIG. 2 illustrates a relationship between the sample points. For example, the graph shows a geometric relationship between increasing urethane weight and flexural modulus. The applicant has defined by experiments that a minimum weight percentage of urethane repeating units (—NHCOO—) above about 23% corresponds to a flexural modulus that would be suitable for use in optical lenses.

The TPUs with a weight percentage of polyurethane units (—NHCOO—) above 23% are especially suitable for use in rimless eyewear. As stated above, the polyurethane repeating units are capable of forming hydrogen bonds, resulting in increased resistance to stress induced cracking and crazing associated with drilling into a lens. A more detailed description of TPUs resistance to stress induced cracking and crazing is provided below in the discussion of forming Isoplast 301 into lenses.

Several thermoplastic polyurethanes with a weight percentage of urethane repeating units above 23% also have suitable optical properties for use in optical lenses. These polyurethanes include, but are not limited to, Isoplast 301, 2530 and 2531 and Tecoplast TP-470. They typically have refractive indexes, $n_d$, above 1.54, Abbe numbers above 27, and light transmission above about 90%. In addition, they are easily tintable (as will be shown below), solvent resistant, and have glass transition temperatures, $T_g$, between 100° C. (212° F.) and 140° C. (284° F.), with some under 120° C. (248° F.), for example. However, these TPUs also have a tendency to progressively yellow, as discussed below regarding the experiment with Isoplast 301, due to photo degradation and thermo-oxidative degradation. The progressive yellowing may be stabilized by utilizing the additive mixtures as more fully described below.

TPUs with high weight percentages of urethane repeating units may be formed into lenses using injection molding and compression molding techniques, as is commonly known in the art. A material with a low glass transition temperature is desirable, preferably below 130° C., when using these techniques because a higher glass transition temperature requires more heat and requires a longer cool down period during lens formation. Higher heat exacerbates thermo-oxidative degradation while longer cool down periods increase cycle time. The lens may also be tinted and may additionally be coated with a protective layer as is known in the art. Furthermore, lenses are commonly drilled into, as will be described below, when mounted on rimless frames. The following description provides an illustrative example of forming a TPU with a high weight percentage of urethane repeating units (—NH-COO—) into an optical lens that has a strong resistance to stress induced cracking and crazing, which includes an optional tinting procedure.

TPU Lens Example

The Isoplast 301 thermoplastic polyurethane having a urethane content of 29% and a flexural modulus of 2300 MPa from Dow Chemical was injection molded into 2 mm thick 6-base plano lenses using a Nissei FN4000 molding machine equipped with a 2-cavity mold in several experiments. The FN4000 is a 200-ton hydraulic machine with a maximum injection speed of 5.2 inch per second (132 mm/sec). Key molding process parameters are as followings:

| | |
|---|---|
| Melt temperature: | 480° F. (249° C.) |
| Mold Temperature: | 200° F. (93° C.) |
| Injection Speed: | 10% |
| Shot size: | 23 mm |
| Hold pressure: | 45% |
| Inject time: | 10 seconds |
| Cool time: | 70 seconds |
| Inserts: | 76 mm 6-base steel inserts. |

Plano lenses, two at a time, having a center thickness about 2 mm were produced consistently. As shown in Table 2 below, the resulting lenses have high rigidity, high transmission, and low haze.

TABLE 2

| | Test Method/Equipment | Coating | Value |
|---|---|---|---|
| Refractive Index | Metricon FP-42 | No | 1.593 ($n_d$) |
| Abbe Number | Metricon FP-42 | No | 30.4 ($v_d$) |
| Transmission | Hazegard | No | 89.7% |
| Haze | ISTM 02008 | No | 0.30 |
| HVI | ANSI Z87.1 | No | Pass |
| Glass Transition($T_g$) | DSC/TA Instrument | No | 116° C. |
| Rimless-mount Performance | Essilor | Crizal | pass |

Figure 3A:
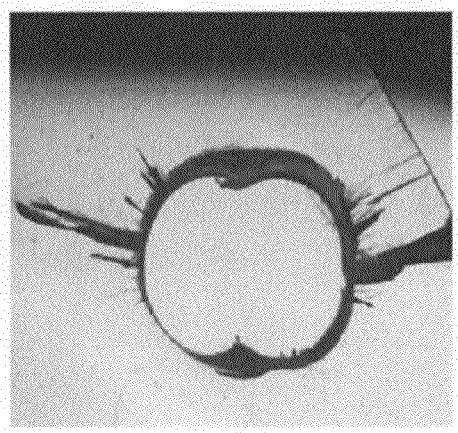
FIG. 3A is a photograph of a nasal bore hole of a polycarbonate lens.
Figure 3B:
FIG. 3B is a photograph of a nasal bore hole of a TPU lens.

A drill-mount performance test was conducted on the Isoplast 301 TPU lenses and on GE Lexan ophthalmic grade polycarbonate lenses, which are commonly used in the art, for comparison. Both types of lenses were coated with a hard coating followed by an antireflection (AR) coating, for example Crizal® brand AR. The lenses were edged and drill-mounted to a Charmant rimless frame. The frames of each type of lens were worn by users for about 12 months and compared. In order for a lens to be qualified as 'PASS', there should not be any cracks that are visible to the naked eye around any of the bore holes for mounting. Comparative photographs of the lenses are shown in FIGS. 3A and 3B. As can be seen in FIG. 3A, the nasal bore hole on the polycarbonate lens exhibited significant, visible cracking. In FIG. 3B, the nasal bore hole on the TPU lens did not exhibit any cracks. The results show that the optical surface and sidewall of the TPU lens have a greater resistance to stress induced cracking and crazing.

Figure 4:
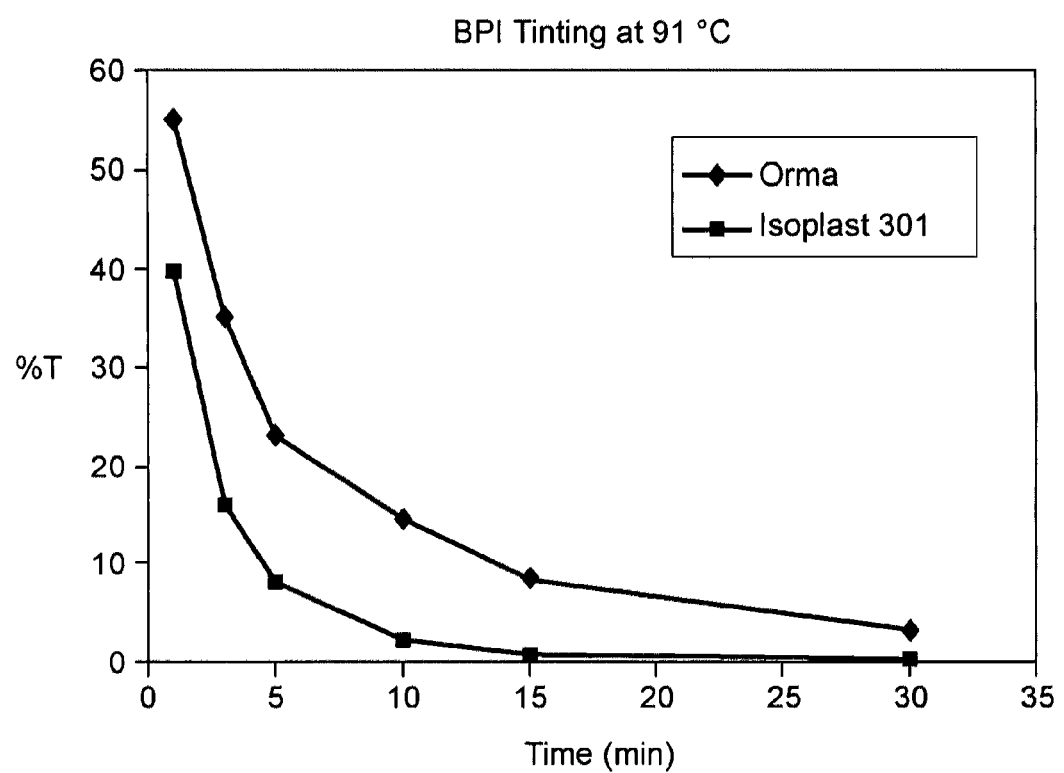
FIG. 4 is a graph plotting transmission versus time of submersion in BPI tinting solution for a TPU lens and a CR-39 lens.

The Isoplast 301 TPU lenses were also tinted using BPI black tinting solution. The solution was prepared by dissolving 80 mL of "BPI Molecular Catalytic" into 800 mL of water at room temperature. The tinting solution was heated to, and maintained at, 91° C. before submerging the TPU lenses. After certain set periods of time, the lenses were retrieved and the corresponding transmittances were measured. FIG. 4 is the resulting transmittance versus tinting time curves for 2 mm thick plano TPU lenses in comparison to ORMA (CR-39) lenses of the same thickness. The CR-39 curve is on top, indicating uniformly higher transmission. The TPU curve is on the bottom, indicating uniformly lower transmission. The TPU lens achieved a light transmittance under 10% within 5 seconds of submergence into the BPI solution. In conclusion, the TPU lens was more easily tintable at all time intervals tested. Commercially, this means a greater tint can be achieved in a shorter time span.

The present invention includes a method for improving the optical properties of TPUs by incorporating additives into the TPU resins. A proper mix of additives comprising antioxidants, ultra-violet light absorbers (UVA), and hindered amine light stabilizers (HALS) improve optical properties of TPU materials. An experiment conducted with Dow Chemical's Isoplast 301, a TPU with a high tendency toward yellowing due to photo degradation and thermo-oxidative degradation, provides an illustrative example of a method of the present invention.

Stabilization of Progressive Yellowing Example

In the experiment, five grams of the additive mixture of Irganox 1098 antioxidant, Tinuvin 328 UVA, and Tinuvin 144 HALS from Ciba Specialty Chemicals in a 1:2:2 weight ratio was blended into one kilogram of Isoplast 301 resin. The resin was then injection-molded into 2 mm thick 6-base plano lenses. The yellowness index of the lenses was measured by Lambda 900 and determined to be 5.27. The lenses were subsequently exposed to the Florida sunlight for 5 days. As measured by Lambda 900, the yellowness index changed from 5.27 to 6.26.

For comparison purposes, the Isoplast 301 resin was injection molded without the additive mixture. The yellowness index of lenses molded without the additive mixture changed from 2.36 to 9.90 after being exposed to the sun for 5 days, illustrating the effectiveness of the additive mix on stabilizing the progressive yellowing of the lenses.

For ophthalmic lenses, there is a need to balance processability, with optical and mechanical properties. There is a growing trend toward rimless spectacles, in which the bridge and temple are attached to the lens via brackets that that are bolted through bores made through the lenses. The bridge and temples subject the lens to stress and strain. The lens and any optional coatings are vulnerable to cracking and crazing, particularly since the bores are near the lens edge as can be seen as straight lines in the upper right of FIGS. 3A and 3B.

A widespread problem exists with rimless bridges and temples damaging lenses. Resins typically used for rimmed spectacles, may not be ideal choices for rimless versions. Applicants have identified that TPU's have acceptable flexural moduli for rimless spectacle applications, depending on the particular requirements for lens power, semi-finished or finished, etc. Within TPU resins, Applicants have discovered a correlation between increasing urethane weight and a positive increase in flexural moduli. In other words, flexural modulus increases geometrically with increasing urethane weight. There is a further relationship to increased hydrogen bonding that provides good stress cracking resistance. Lenses made according to the invention meet FDA 21 CFR 801.41 Impact Requirement, and ANSI Z87.1 high velocity impact (HVI) standard. Accordingly, urethane weight is a predictor of flexibility and stress resistance.

However, the acceptable TPU resins meeting the above requirements, frequently lack the color balance typically associated with ophthalmic lenses. Color balance may be quantified by Abbe number, index of refraction, or yellowness index. So while the mechanical properties of TPU resins appear promising, the lesser optical properties clearly explain why TPU's have historically not been used for injection molded ophthalmic lenses. Applicant's further discovered that by selecting TPU resins with low $T_g$, that certain color factors could be controlled. The lower $T_g$ improved processability making it easier to blend in additives. However, test lenses indicated that the additives initially increase yellowness. Surprisingly, weathering tests indicated that the yellowness was stabilized and deteriorated only slightly compared to test lenses without additives. In addition, the lower $T_g$ allows shorter residence time in the injection molding machine, thereby reducing thermo-oxidative degradation. Finally, the selected TPU resins have excellent solvent resistance while being more easily tintable than CR-39. This is quite beneficial, since CR-39 is more easily tintable than polycarbonate.

Suitable TPU's for use in the invention may include the following ranges or specific values for various property measurements:

Tensile strength at yield, according to ASTM D 638, between 60 and 72 MPa, for example 63-69 MPa; Tensile strength at break, according to ASTM D 638, between 60 and 72 MPa, for example 63-69 MPa; Elongation at yield, according to ASTM D 638, between 5-8%, for example 6-7%; Elongation at break, according to ASTM D 638, between 130-170%, for example 140-160%; Tensile modulus, according to ASTM D 638, between 1,700-2,300 MPa, for example 1,900-2,100; Flexural strength, according to ASTM D 790, between 87-100 MPa, for example 90-97 MPa; Flexural modulus, according to ASTM D 790, above 1,850 MPa, for example between 2,000-2,350; Izod impact strength, according to ASTM D 256, between 75 and 138 J/m (3.2 mm @ 23° C.) and between 33 and 69 J/m (3.2 mm @-40° C.); Instrumented dart impact, according to ASTM D 3763. between 75-95 J @ 23° C. and 68-97 J @-29° C.; Rockwell hardness, according to ASTM D 785, between 117-147 R scale and between 45-84 M scale; Heat deflection temperature under load, according to ASTM D 648, between 75-94° C. HDT/B (0.46 MPa) unannealed and between 83-114° C. HDT/B (0.46 MPa) annealed; between 71-81° C. HDT/B (1.8 MPa) unannealed and between 84-104° C. HDT/B (1.8 MPa) annealed; Vicat temperature, according to ASTM D 1525, between 97-127° C.; glass transition temperature between 100-140° C., for example between 100-130° C. and more particularly between 100-120° C.; Coefficient of Linear Thermal Expansion, according to ASTM D 696 about $6.1\ K^{-1} \times 10^{-5}$; Light transmission, according to ASTM D 1003, between 83-95%; yellowness index, according to ASTM D 1925, between 4-12.

Having described preferred embodiments for lens manufacturing, materials used therein and methods for processing the same (which are intended to be illustrative and not limiting), it is noted that modifications and variations can be made by persons skilled in the art in light of the above teachings. It is therefore understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of thermoforming thermoplastic polyurethanes (TPU) into an ophthalmic lens having an optical surface wherein the resulting lens exhibits a reduction in the initiation and propagation of flaws, comprising the steps of:

selecting a TPU having urethane repeating units (—NH-COO—) that are at least 23% by weight, wherein said TPU has an Elongation at Break value of between 140% and 160%, a flexural modulus above about 1,400 Mpa, an Abbe number between about 27 and about 45 and a refractive index, $n_d$, between about 1.54 and about 1.60;

thermoforming a highly transmissive, tintable ophthalmic lens from the TPU by one of injection molding and compression molding, wherein the formed lens contains about 99.5% TPU by weight and about 0.5% additives by weight, wherein the additives include an antioxidant, an ultra-violet light absorbers, and a hindered amine light absorber to stabilize progressive yellowing of the lens;

tinting the thermoformed lens;

coating the tinted lens with at least one protective layer; and drilling through the coating and the tinted lens to form a bore bordered by a sidewall, wherein the stated weight percentage of urethane repeating units (—NHCOO—) renders an optical surface and a sidewall with improved containment of flaws created in the coated, tinted TPU lens during drilling so that flaws are less likely to grow and propagate causing cracking and crazing in the tinted lens and protective coating layer.

2. The method of claim 1, wherein the TPU has a glass transition temperature ($T_g$) of between about 100° C. and about 140° C.

3. The method of claim 1, wherein the TPU is solvent resistant.

4. An ophthalmic lens produced by the method of claim 1.

5. The method of claim 2, wherein said forming step comprises injection molding an ophthalmic lens.

6. The method of claim 2, wherein said providing step includes blending an optical color stabilizer with the TPU; and wherein said forming step comprises injection molding an ophthalmic lens.

7. An ophthalmic lens for a rimless spectacle produced by the method of claim 1.

* * * * *